United States Patent [19]

Denzin

[11] 4,371,416

[45] Feb. 1, 1983

[54] SUBASSEMBLY COMBINATION FOR MAIL PROCESSING MACHINES

[75] Inventor: Horst Denzin, Berlin, Fed. Rep. of Germany

[73] Assignee: Francotyp GmbH, Berlin, Fed. Rep. of Germany

[21] Appl. No.: 208,431

[22] Filed: Nov. 19, 1980

[30] Foreign Application Priority Data

Nov. 30, 1979 [DE] Fed. Rep. of Germany ....... 2948928

[51] Int. Cl.³ ............................................ B29H 9/00

[52] U.S. Cl. ............................ 156/441.5; 156/442.2

[58] Field of Search .................. 156/442, 441.5, 442.2

[56] References Cited

U.S. PATENT DOCUMENTS

| | | | |
|---|---|---|---|
| 1,421,867 | 7/1922 | Vidaver | 156/442 |
| 1,482,731 | 2/1924 | Burr | 156/442 |
| 2,302,060 | 11/1942 | Ryan | 156/442 X |
| 3,168,428 | 2/1965 | Dorn et al. | 156/442 |
| 3,186,890 | 6/1965 | Dorn et al. | 156/442 |

*Primary Examiner*—David A. Simmons

*Attorney, Agent, or Firm*—Herbert L. Lerner; Laurence A. Greenberg

[57] ABSTRACT

Subassembly combination for mail processing machines, including a letter feeding machine, and a moistening device having a rotatable drum for moving mail-wetting liquid and a sealing device being mountable on the letter feeding machine, the letter feeding machine having a transport cylinder for transporting mail, a common drive gear for the letter feeding machine, moistening device and sealing device, and a common shaft on which the transport cylinder and drive gear are mounted, and a serrated belt disposed on the common drive gear for selectively driving the sealing device and the rotating drum.

3 Claims, 2 Drawing Figures

SUBASSEMBLY COMBINATION FOR MAIL PROCESSING MACHINES

Figure 1:
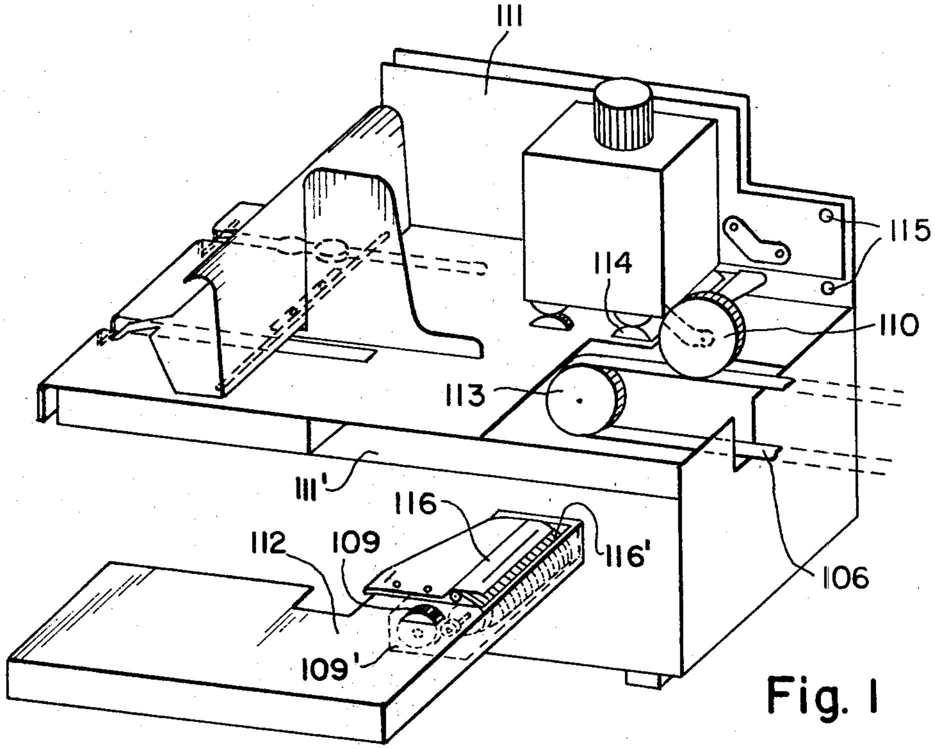

The invention relates to a subassembly combination for mail processing machines, particularly for a letter feeding machine with a moistening and sealing device that can be mounted thereto.

Mail processing machines, such as letter feeding machines with a moistening device, sealing device and franking machines are made as individual equipment and are assembled into mail processing lines by alignment with each other. By procuring the individual machine subassemblies as required, a mail processing line is formed that includes machines which each have their own drive. This system is uneconomical.

It is accordingly an object of the invention to provide a subassembly combination for mail processing machines which overcomes the hereinafore-mentioned disadvantages of the heretofore-known devices of this general type, and to provide an expandable subassembly combination, the corner stone of which is a letter feeding machine to which a moistening and a sealing device can be subsequently mounted.

With the foregoing and other objects in view there is provided, in accordance with the invention, a subassembly combination for mail processing machines, comprising a letter feeding machine, and a moistening device having a rotatable drum for moving mail-wetting liquid and a sealing device being mountable on the letter feeding machine, the letter feeding machine having a transport cylinder for transporting mail, a common drive gear for the letter feeding machine, moistening device and sealing device, and a common shaft on which the transport cylinder and drive gear are mounted, and a serrated belt disposed on the common drive gear for selectively driving the sealing device and the rotating drum.

In accordance with another feature of the invention, the sealing device includes a transport wheel for transporting mail, a mail sealing cylinder, two gears being rotatabe by the serrated belt, a first shaft on which the transport wheel and one of the two gears is mounted, and a second shaft on which the sealing cylinder and another of the two gears is mounted.

In accordance with a further feature of the invention, the moistening device includes a wheel, and the letter feeding machine includes a counter wheel, the wheel of the moistening device being operable for guiding the serrated belt and for driving the rotating drum in conjunction with the counter wheel of the letter feeding machine.

In accordance with a concomitant feature of the invention, the sealing device includes a tensioning roller for ensuring uniform tension of the serrated belt.

Other features which are considered as characteristic for the invention are set forth in the appended claims.

Although the invention is illustrated and described herein as embodied in a subassembly combination for mail processing machines, it is nevertheless not intended to be limited to the details shown, since various modifications and structural changes may be made therein without departing from the spirit of the invention and within the scope and range of equivalents of the claims.

Figure 2:
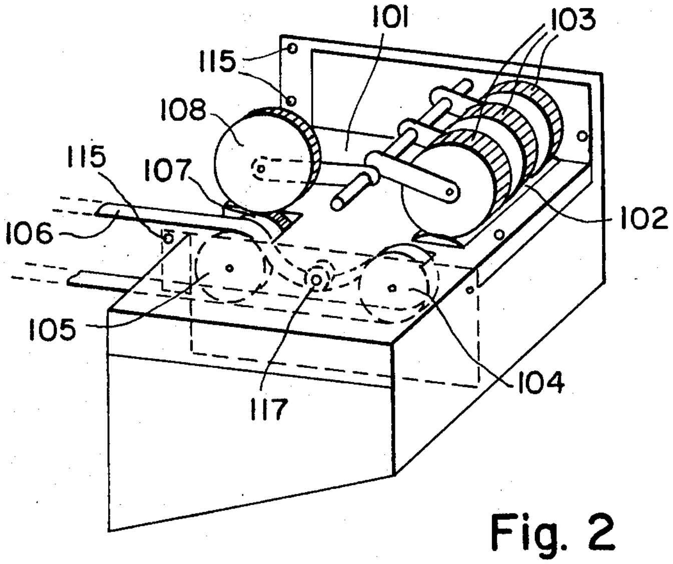

The construction and method of operation of the invention, however, together with additional objects and advantages thereof will be best understood from the following description of specific embodiments when read in connection with the accompanying drawings, in which:

FIG. 1 is a diagrammatic perspective view of a letter feeding machine with a moistening device; and FIG. 2 is a diagrammatic perspective view of a sealing device.

Referring now to the two figures of the drawing as a whole, it is seen that by inserting a moistening device 112 into an opening 111 in a letter feeding machine 111 and adding a sealing device 101, a letter sealing machine is produced. To establish a common drive for the letter feeding machine 111 and the sealing device 101, a gear 113 is mounted on the shaft of a transport cylinder 114 of the letter feeding machine 111. The sealing device 101 includes a sealing cylinder 102 with pressure rollers 103. The pressure rollers 103 are pressed against the sealing cylinder 102 by springs. A gear 104 is placed, as a drive element, on the same shaft as the sealing cylinder 102. The further drive wheel 105 is located, together with a transport wheel 107, on a further shaft. A pressure wheel 108 is associated with the transport wheel 107. The transport wheel 107 and the pressure wheel 108 serve for transporting the letters from the letter feeding machine 111 to the sealing cylinder 102 which passes-on the sealed letters to a following franking machine, for instance. With the moistening device 112 removed, the sealing device 101 is placed onto the letter feeding machine 111 and is detachably connected thereto at the points 115 by means of fastening elements. A serrated belt 106 is placed as a driving element over the gear 113 of the letter feeding machine 111, and the gear 104 and the drive wheel 105 of the sealing device 101; a tensioning roller 117 in the sealing device 101 ensures constant pretension of the serrated belt 106. A moistening element 116 is provided in the moistening device 112 for wetting the letters or envelopes as they are transported by the belt 106. For guiding the serrated belt 106 and, if applicable, for operating a drum 116' which moves the liquid from a reservoir 109' for wetting the moistening element 116, a wheel 109 is provided in the moistening device 112, and a counter wheel 110 is provided at the letter feeding machine 111.

In summary, the invention provides a subassembly combination for mail processing machines which includes a letter feeding machine with a moistening device and a sealing device. Only one drive is used for all transport and sealing wheels or cylinders, which is associated with the letter feeding machine and moves the drive units of the other devices by means of a serrated belt. The combination is constructed according to the building block principle.

There are claimed:

1. Subassembly combination for mail processing machines, comprising a letter feeding machine, and a moistening device having a rotatable drum for moving mail-wetting liquid and a sealing device being mountable on said letter feeding machine, said letter feeding machine having a transport cylinder for transporting mail, a common drive gear for said letter feeding machine, moistening device and sealing device, and a common shaft on which said transport cylinder and drive gear are mounted, a serrated belt disposed on said common drive gear for selectively driving said sealing device and said rotating drum said sealing device including a transport wheel for transporting mail, a mail sealing cylinder, two gears being rotatable by said serrated belt, a first shaft on which said transport wheel and one of said two gears is mounted, and a second shaft on which said sealing cylinder and another of said two gears is mounted, said moistening and sealing devices being attachable to and detachable from said letter feeding machine independently of the operation of said letter feeding machine.

2. Subassembly combination according to claim 1, wherein said moistening device includes a wheel, and said letter feeding machine includes a counter wheel, said wheel of said moistening device being operable for guiding said serrated belt and for driving said rotating drum in conjunction with said counter wheel of said letter feeding machine.

3. Subassembly combination according to claim 1, wherein said sealing device includes a tensioning roller for ensuring uniform tension of said serrated belt.

* * * * *